Jan. 7, 1947.   T. A. BOWERS   2,414,013
PISTON SEALING MEANS
Filed Feb. 28, 1944
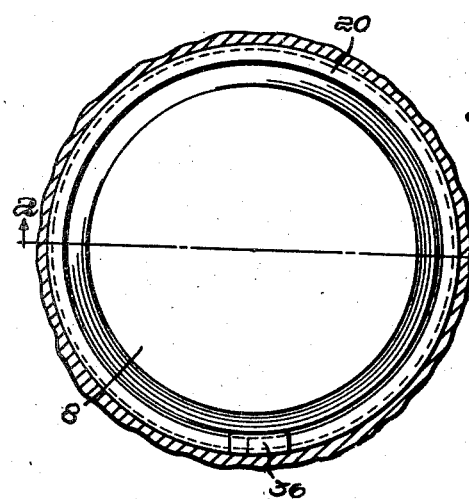
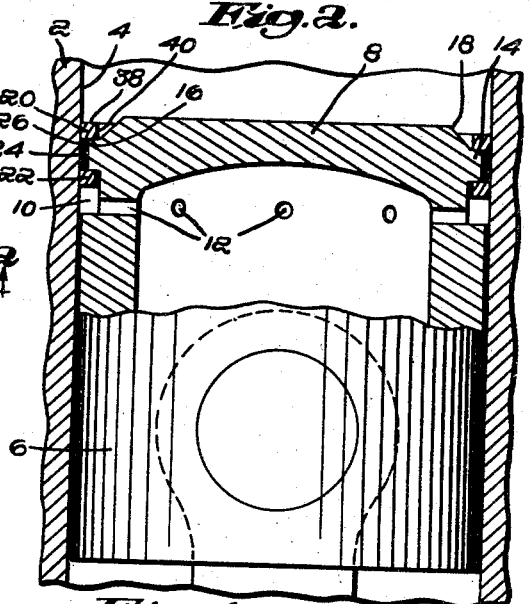
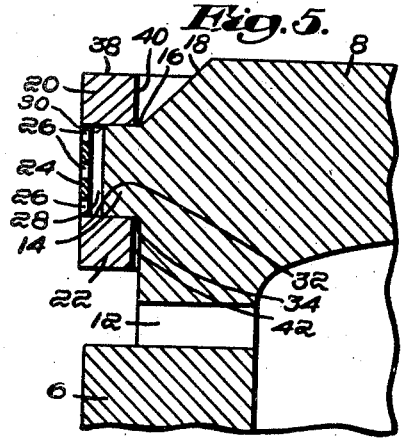
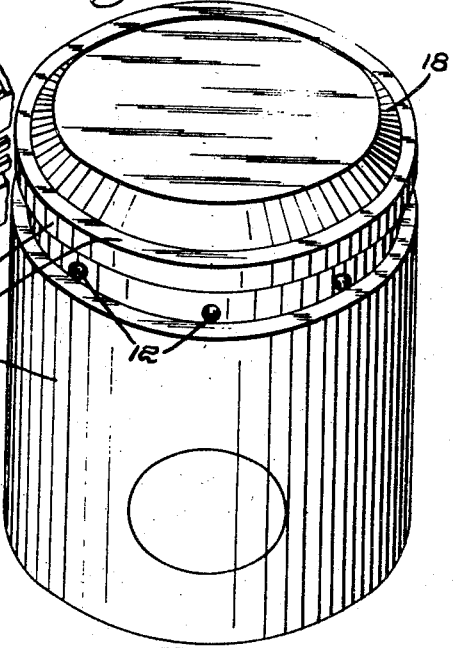
Inventor:
Thomas A. Bowers
Attorney Patented Jan. 7, 1947

2,414,013

UNITED STATES PATENT OFFICE 2,414,013

PISTON SEALING MEANS

Thomas A. Bowers, Mattapoisett, Mass.; Elizabeth M. Bowers, administratrix of said Thomas A. Bowers, deceased, assignor of two-thirds to Munroe H. Hamilton, Lexington, Mass.

Application February 28, 1944, Serial No. 524,224

4 Claims. (Cl. 309—24)

This invention relates to pistons and piston rings, and its objects are to improve devices of this character and to provide means for more efficiently sealing a piston in a cylinder, with a view to controlling cylinder and ring wear and to avoiding difficulties arising in connection with blowby and carbon deposits. Another object of the invention is to deal with the wear which results from a piston ring being free to move in a piston groove, as for example hammering of the ring in the piston groove; "slap" of the piston against the cylinder wall; tipping of a ring so that an edge is intermittently forced with fluctuating pressures against the cylinder periphery, and other causes. The invention further includes among its objects a decrease in the number of piston rings required to seal a piston, reduction in the size and weight of pistons, and other changes directed generally to increasing the efficiency of internal combustion motors.

In the accompanying drawing:

Fig. 1 is a plan view illustrating a piston and piston ring of the invention;

Fig. 2 is a vertical cross section taken on the line 2—2 of Fig. 1 with the piston and ring being mounted in a cylinder;

Fig. 3 is a fragmentary perspective view of the ring member of the invention;

Fig. 4 is a perspective view of a piston similar to that shown in Figs. 1 and 2; and Fig. 5 is an enlarged detail cross-sectional view.

The invention generally includes a piston formed with a single seating surface, a piston ring member, and spring means for urging the ring member axially downward into continuously seated relation with respect to the piston seating surface. The spring means is especially arranged to exert a force acting in an axial direction away from the head of the piston, and provides a light tension which, while maintaining the ring in seated relation, permits the ring to flex radially and to exert a definite wall pressure on a cylinder. In addition, the ring is mounted at the top of the piston so that it is subject to combustion gas pressure, and its upper side lies directly in the combustion chamber with the piston ring being free from contact or close proximity to any overhanging surface on which carbon may be deposited.

Referring more in detail to the drawing, numeral 2 denotes a cylinder having an inner peripheral surface 4. Mounted within the cylinder 2, in spaced relation to the peripheral surface 4, is a piston 6, secured to a crank member and presenting a flat head 8. Extending around the outer side of the piston is a groove 10 and connecting with the groove 10 at separated points are oil passages 12. The head 8 of the piston is reduced in diameter to an extent generally corresponding to the depth of the groove 10 and is tapered inwardly to form a beveled surface 18, as may be more clearly seen in Figs. 2 and 4 of the drawing. The reduced portion of the piston head occurs in spaced relation to the groove 10 to leave a land or rib 14, and the upper side of the land 14 is formed with a flat piston seating surface 16.

Mounted on the piston is a composite piston ring member including an upper ring portion 20 and a lower ring portion 22 secured one to the other by an annular web 24. Resilient character is imparted to the web 24 by slots 26 which are cut through the web and arranged in an irregular or overlapping manner. The radial width of the ring portions 20 and 22 exceeds the radial width of the annular web 24 and the latter member is preferably arranged so that its outer periphery coincides with the outer peripheries of the ring portions with the result that there is left a space or channel 28 between the ring portions. The width of the channel 28, considered axially, is normally less than the axial width of the land or rib 14. Due to the expansible character of the composite ring resulting from the resilient web 24, the width of channel 28 may be increased by stretching or springing the ring portions 20 and 22 apart, and in an extended position the ring is snapped on over the land 14 as shown in Fig. 2. In this position the ring develops an axial tension which continually urges the seating surface 30 of ring portion 20 against the piston seat or land surface 16 and provides a combustion gas seal of improved character. At the same time the seating surface 32 of ring portion 22 is urged against the land surface 34 to provide a seal for excluding oil from passing up around the ring.

The composite ring, including the top and bottom ring portions 20 and 22 as well as the resilient web 24, constitutes a split ring of the type commonly referred to as a "C type" ring whose ends are normally spaced apart as shown in Fig. 3. The ring is mounted in a cylinder in a compacted position in which the ring tends to revert to its normal position and thus exerts a wall pressure against the cylinder wall and provides radial flexibility. The axial tension resulting from mounting the ring on the land 14, with the radial web 24 in an extended position, is of a limited degree which always permits the ring to develop a suitable radial flexibility and wall pressure so that the ring periphery will constantly adhere to the cylinder periphery.

When the ring is compacted in a cylinder, the ends are brought closer to one another but there still remains a gap or opening which it is desirable to close and for this purpose I have provided a gap-sealing member 36 which may consist of some suitable closure device as a right angularly shaped piece of metal, adapted to overlie the two ends of the ring and close the space at both the top sides and inner sides of the ring.

In operation, the axial or vertical tension by which the upper and lower ring portions 20 and 22 are tightly clamped against the land 14, maintains the seating surface 30 of the ring in continuously sealed relation with respect to the seating surface 16 of the land or rib portion. At the same time, the ring is free to flex in a radial direction, with the ring seating surface 30 sliding in and out on the piston seating surface 16 and thus allowing the ring to conform to any irregularity which may be present in the periphery 4 of the cylinder. The arrangement of the ring at the top of the piston results in the upper ring portion 20 having its top surface 38 and its inner peripheral surface 40 lying directly in the combustion chamber. Combustion gas pressure is thus allowed to act on the ring to seal it tightly against the land surface 16 in a very efficient manner while a vertical tension is maintained which is developed from points lower in the piston. The ring and piston thus work in combination with one another to provide a means of preventing axial displacement of the ring relative to the piston and yet permitting the ring to move radially and to be subject to combustion gas pressure for sealing purposes.

The continuously seated relation of the ring with respect to the piston operates to advantage especially at those points at which the piston changes the direction of its stroke at the top of the cylinder. In ordinary ring installations, a ring at the time a piston changes its stroke may, due to its momentum, leave its seat in the piston groove and come to rest with a definite impact against the other side of the groove. The ring of the invention resists such displacement, and in so doing eliminates a series of impacts, often termed "hammering," which may appreciably wear the surface of the piston seat or the ring itself, and make it impossible to maintain a tight seal to exclude gas pressure. Only a very little wear is necessary to create a tiny crack or space into which hot combustion gases can enter and burn the lubricant on the seating surfaces. Once the lubricant is burned, wear proceeds at a greatly accelerated pace.

Another feature in the operation of the ring, running in continuously seated relation, is control of piston "slap" against the cylinder or against the inner periphery of the ring and thus indirectly against the cylinder. The axial tension of the ring creates a friction between the ring seating surface and the piston seating surface and in order for the piston to slap, it must overcome this friction force. The result is that the ring functions as a brake or cushion which is effective in converting the side thrust of the piston from a sharp impact into a rapidly increasing pressure and the wear of such piston movement is largely overcome.

In conjunction with its braking or cushioning function, the continuously seated ring also serves to reduce wear from piston slap in another way. The axial tension of the ring portions on the piston land surface tends to prevent the piston from assuming an angular position, or one in which its axis is out of alinement with the axis of the cylinder, such as commonly occurs at the instant of change of direction of the piston stroke. Contact of the piston against the inner periphery of the ring, while the piston is in an angularly disposed position, either results in slightly tipping one side of the ring itself or in causing an upper edge of the ring to bear nonuniformly against the cylinder periphery and in either case excessive cylinder wear occurs. The effect of the axial tension of the ring on the piston tends to keep the piston from assuming an angular position and tipping the ring. In this way, wear is also reduced at those points where the skirt of the piston strikes against the cylinder wall.

A very substantial degree of protection for the ring surface 30 and the land surface 16 is afforded by preventing wear in the several respects noted. As a result I obtain an exceedingly efficient seal between the two surfaces and the seal is characterized by long life and dependability to a point where it becomes practical to rely on a single ring in place of four or five rings as are conventionally utilized.

The arrangement of the ring at the top of the piston has already been referred to in connection with allowing combustion gases to act on the ring and provide for a tight seal. The same arrangement is also designed to provide a means of controlling carbon deposits, a substance which is formed from combustion gases and which may destroy the seal between a ring and its seat, or which may jam the ring in a piston groove. In conventional ring installations, the ring being free to slap in a piston groove, continually shakes itself free of carbon deposits and this is a principal reason for allowing the ring to "slap." In the ring of the invention, there are only two sides on which carbon may be deposited, i. e. the top side 38 and the inner periphery 40. Since there is no piston groove present there is no opportunity for carbon to jam at the top of the ring.

To take care of the inner periphery of the ring, the piston has been cut away to form the bevel surface 18. As the ring reciprocates in a cylinder, it moves radially in and out on its seat and any carbon which is deposited between the inner periphery of the ring and the beveled surface is broken up and forced upward on to the top of the piston where it is blown out with exhaust gases. The sharp edge of the ring lying on the seat 16, under tension, acts like a chisel which continually cuts away any carbon deposit on the seat 16, and the tension prevents the ring from sliding over carbon deposits without cutting it away. A further factor in the control of carbon deposit is the efficient seal between the ring and piston at all times which keeps oil from passing up around the ring and becoming burned.

The ring portion 22 which is clamped at the under land surface 34, in addition to functioning as a clamping member for holding the ring downward on the piston seat, also serves as an oil scraping ring, and to facilitate this action as an oil scraping or oil scavenging member, the oil passages 12 have been formed to connect with the groove 10 in the manner shown. There is thus obtained in one piston ring, compression sealing means (the ring portion 20), and oil sealing means, since the tension at the under land surface 34 provides for the ring sealing at this point and thus preventing oil from escaping around the ring.

It will be noted that the groove 10 is of a sufficient depth to provide a slight clearance 42 between itself and the ring portion 22. This space provides a reservoir in which oil is constantly being collected. The body of oil occurring all the way around the piston in back of the ring is effective in absorbing piston thrust, and this absorbing action of the oil reservoir cooperates with the cushioning action which is obtained from the continuously seated relation of the ring on the land surface 16.

The ring portions 20 and 22 and the resilient web may be formed of several different materials as for example I may form the ring portions 20 and 22 of cast iron and the resilient web 24 of steel. Other types of spring devices may be utilized to secure the two rings together and to hold the ring under tension on a piston seating surface. The several ring elements may be secured together in some suitable manner such as welding, or I may desire to form the ring out of a single length of material.

Considering the advantages of the ring and particularly the advantages which accrue from holding the ring down in a continuously seated relation on the land surface, it is pointed out that no sharp slap or impact occurs between the ring and piston land surface 16 at any time during the stroke of the piston and as a result the piston land surface 16 is appreciably protected from wear and a true seating surface is preserved throughout the life of the ring, against which the seating surface 30 of the ring may be squarely held and a more efficient seal obtained. Reduction of wear from preventing the ring's being tipped is also accomplished and "blowby" is greatly minimized. By providing a seal which is always maintained and protected from wear in the several ways noted, one ring may be utilized to do the work of several and, at the same time, the cost of forming a piston with a plurality of piston ring grooves may be eliminated. The piston itself may be decreased in length since the space in which the ring grooves are commonly formed is no longer required. By thus shortening the length of the piston, it is possible to decrease the height of the cylinder block and thus to decrease the total weight of a motor, with an increase in efficiency. The piston itself, in addition to being made shorter, may also be of lighter construction, owing to the fact that reinforced portions commonly required to provide for piston ring grooves may be eliminated.

While I have shown a preferred embodiment of my invention, it should be understood that various changes and modifications may be made, in keeping with the spirit of the invention as outlined in the appended claims.

I claim:

1. A piston ring structure comprising opposed sealing members connected by an intervening slotted metallic web, said structure being adapted to be clamped about an extending rib on a piston and resiliently to grip oppositely disposed surfaces of said rib.

2. In combination, a cylinder, a piston mounted in said cylinder carrying a circumferentially extending rib, and a piston ring structure comprising opposed sealing members connected by an intervening slotted metallic web, said structure being adapted to be clamped about an extending rib on said piston and resiliently to grip oppositely disposed surfaces of said rib.

3. In combination a piston carrying a circumferentially extending rib, a piston ring structure comprising opposed sealing members connected by metallic spring means, said piston ring structure being adapted to be clamped about the extending rib on said piston and resiliently to grip oppositely disposed surfaces of said rib, said connecting means for the opposed sealing members occurring in spaced relation to the outer peripheral edge of the extending piston rib to provide an oil reservoir, said connecting means being formed with openings for permitting passage of oil into and out of the said reservoir.

4. In combination, a hollow piston carrying a circumferentially extending rib, a piston ring structure comprising opposed sealing members connected by metallic spring means, said piston ring structure being adapted to be clamped about the extending rib on said piston and resiliently to grip oppositely disposed surfaces of said rib, said connecting means occurring in radially spaced relation to the piston rib, said piston having oil passages formed therein, said oil passages extending through the piston wall at a point directly below the said piston ring structure.

THOMAS A. BOWERS.